Aug. 6, 1935.         J. L. GRANT         2,009,999
INSULATOR FOR HANDLED VESSELS
Filed Feb. 24, 1934

Inventor
JOHN LESLIE GRANT.

By Emerol B. Wiener
Attorney

Patented Aug. 6, 1935

2,009,999

UNITED STATES PATENT OFFICE 2,009,999

INSULATOR FOR HANDLED VESSELS

John Leslie Grant, Detroit, Mich.

Application February 24, 1934, Serial No. 712,822

1 Claim. (Cl. 16—119)

This invention relates to insulators for handled vessels and the object of the invention is to provide a heat insulator for the handles of teapots, coffee pots and similar vessels for hot liquids arranged to prevent the heat from passing into the handle of the particular vessel with which the device is used.

Another object of the invention is to provide an insulator in which there is no metal to metal contact through the insulator so that the heat cannot pass directly from one side to the other side of the insulator.

A further object of the invention is to provide an insulator for handled vessels to which the handle may be firmly attached to provide a strong connection between the handle and the body of the vessel.

Another object of the invention is to provide an insulator forming a connection between the vessel body and the handle and having metal surfaces to which the body and handle may be soldered or otherwise attached but arranged to prevent heat transfer from the body to the handle.

These objects and the several novel features of the invention are hereinafter more fully described and claimed and the preferred form of construction by which these objects are attained is shown in the accompanying drawing in which—

Figure 1:
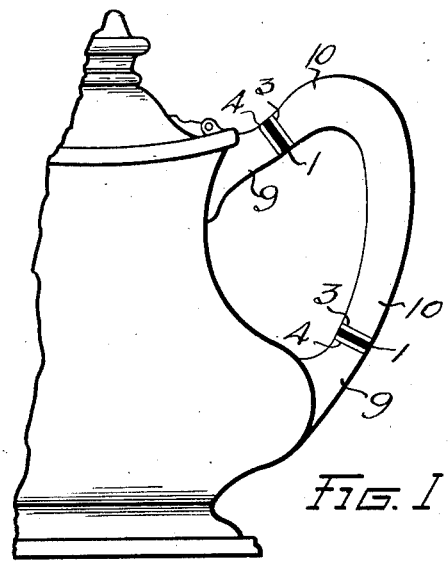
Fig. 1 is an elevation of a portion of a metal teapot showing the insulators in position in the handle.
Figure 2:
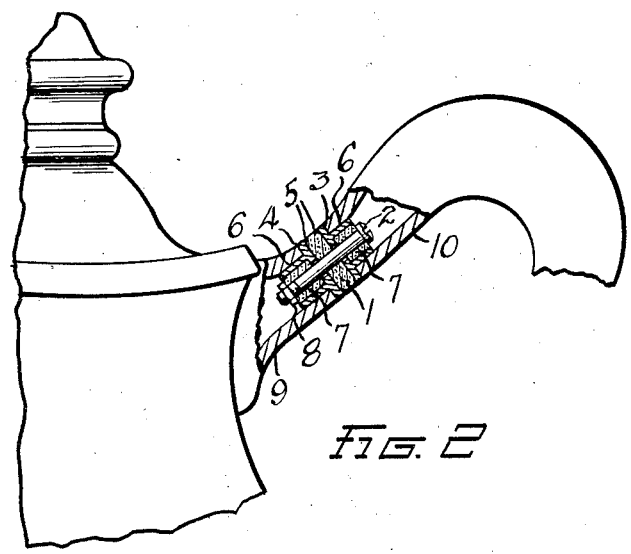
Fig. 2 is an enlarged section through the insulator and adjacent portions of the handle and vessel.
Figure 3:
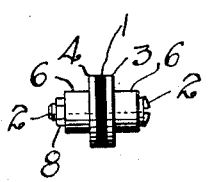
Fig. 3 is an elevation of the complete insulator.

The device comprises a central insulating washer 1 having a central aperture for the bolt 2 and a metal disc 3 is applied to one side of the insulating washer, while a metal disc 4 is applied to the opposite side thereof. Obviously, instead of the bolt 2, a screw or rivet or other suitable securing member may be used. Each disc is provided with an inturned flange 5 at the outer edge and this flange extends circumferentially about each disc so as to hold the fiber washer 1 in position between the discs and prevent axial displacement of the fiber washer in relation to the metal discs. Each metal disc is provided with a central aperture of greater diameter than the bolt 2 as shown in Fig. 2 and the fiber washer 1 supports the bolt 2 in position so that it does not contact either disc 3 or 4. The peripheral flanges 5 prevent axial displacement of the fiber washer 1 in relation to the metal discs 3 and 4 and thus hold the bolt 2 centrally of the apertures in the center of the metal discs. Each metal disc 3 and 4 is provided with an integral cup 6 on the outer side thereof of greater diameter than the central aperture of the respective disc and an insulating plug 7 is mounted in each cup 6 and is provided with a central aperture therethrough for the bolt 2. These insulating plugs also support the bolt 2 out of contact with the discs 3 and 4 and prevent axial displacement thereof. In case a bolt 2 is used, as shown in Figs. 2 and 3, a nut 8 is threaded onto the end of the bolt and is turned up tightly to bindingly secure the parts together at which time, the end of the bolt 2 extending beyond the nut may be headed over if desired to prevent loosening or removal of the nut and consequent looseness of the parts.

In case a rivet is used in place of the bolt 2, a washer is provided in place of the nut 8 and the end of the rivet is headed over the washer to secure the parts together. In either case, the nut 8 or the washer must be of smaller diameter than the diameter of the corresponding plug 7 to prevent metal to metal contact between the nut or washer and the edge of the adjacent cup 6. The head of the bolt 2 or the head of the rivet, as the case may be, must also be smaller than the outer diameter of its adjacent plug 7 to prevent metal to metal contact between the head of the rivet or bolt and the edge of the adjacent metal cup 6. The assembled insulator is shown more particularly in elevation in Fig. 3 and the outer circumferences of the cups 6 provide large surfaces to which the boss 9 on the teapot and the handle 10 may be soldered or otherwise attached and as the ends of the boss 9 and handle 10 may be brought to contact with the flat faces of the discs 3 and 4, solder may also be applied at these points. By this arrangement, a very firm connection is provided between the handle and the teapot and there is no metal to metal contact between the teapot and handle.

From the foregoing description it becomes evident that the device is very simple and efficient in operation, will prevent transfer of heat from the vessel to the handle, is composed of few parts and is of consequent low manufacturing cost and provides a device which accomplishes the objects described.

Having thus fully described my invention, its utility and mode of operation, what I claim and desire to secure by Letters Patent of the United States is—

In an insulator for handled vessels, a pair of metal discs each having an integral cup on one side thereof provided with a cylindrical exterior and with a cylindrical interior each disc being provided with a central aperture forming an annular flange in the bottom of the cup, an insulating plug positioned in each cup and seated on such annular flange and having a central aperture of smaller diameter than and in axial alignment with the aperture in the bottom of the respective cup, an insulating washer having a central aperture of smaller diameter than the apertures in the bottoms of the said cups, the sides of the discs opposite the cups being positioned on opposite sides of the insulating washer and a securing member fitting in the apertures of the insulating plugs and washer and supported thereby in spaced relation with the edges of the apertures in the bottoms of the cups, the outer cylindrical surfaces of said cups being arranged to fit into the handles and adjacent portions of the handled vessel and the portions of the metal discs extending beyond the cups being arranged to be engaged by the ends of the handles and adjacent portions of the handled vessel.

JOHN LESLIE GRANT.